(12) United States Patent
Kiyokawa

(10) Patent No.: US 9,248,734 B2
(45) Date of Patent: Feb. 2, 2016

(54) WORKING VEHICLE

(71) Applicant: ISEKI & CO., LTD., Ehime-ken (JP)

(72) Inventor: Tomoo Kiyokawa, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 0 days.

(21) Appl. No.: 14/519,435

(22) Filed: Oct. 21, 2014

(65) Prior Publication Data

US 2015/0114747 A1   Apr. 30, 2015

(30) Foreign Application Priority Data

Oct. 25, 2013  (JP) .................................. 2013-222474

(51) Int. Cl.
*B60K 13/04*          (2006.01)

(52) U.S. Cl.
CPC ...................................... *B60K 13/04* (2013.01)

(58) Field of Classification Search
CPC .. B60K 13/04; F01N 13/1805; F01N 13/1822
See application file for complete search history.

(56) References Cited

U.S. PATENT DOCUMENTS

| | | | | |
|---|---|---|---|---|
| 3,933,216 | A * | 1/1976 | Irwin ............................. | 180/309 |
| D297,239 | S * | 8/1988 | Funabashi et al. ............. | D15/23 |
| D301,039 | S * | 5/1989 | Funabashi et al. ............. | D15/23 |
| 5,152,364 | A * | 10/1992 | Woods et al. .................. | 180/292 |
| 5,170,020 | A * | 12/1992 | Kruger et al. .................. | 181/211 |
| D390,120 | S * | 2/1998 | Chiang ........................... | D10/12 |
| D489,381 | S * | 5/2004 | Mistry et al. ................... | D15/23 |
| 6,832,872 | B2 * | 12/2004 | Koelm et al. .................. | 404/108 |
| D542,308 | S * | 5/2007 | Oka et al. ....................... | D15/23 |
| 7,458,869 | B2 * | 12/2008 | Tsumiyama et al. ......... | 440/88 A |
| 7,678,168 | B2 * | 3/2010 | Connelly et al. ............. | 55/385.3 |
| 8,286,422 | B2 * | 10/2012 | Yang et al. ..................... | 60/317 |
| 8,371,408 | B2 * | 2/2013 | Kawashiri et al. ......... | 180/69.21 |
| D688,277 | S * | 8/2013 | Hagele et al. .................. | D15/28 |

(Continued)

FOREIGN PATENT DOCUMENTS

EP          2384954 A1     11/2011
JP          H04-8817 A      1/1992

(Continued)

OTHER PUBLICATIONS

European Search Report dated Mar. 16, 2015, for EP 14189770.

(Continued)

*Primary Examiner* — Hau Phan
*Assistant Examiner* — Jacob Meyer
(74) *Attorney, Agent, or Firm* — Bacon & Thomas, PLLC

(57) ABSTRACT

A working vehicle, including: an engine housed inside a bonnet of a front part of a vehicle-body; a purification processing device which performs purification processing of exhaust gas that is discharged from the engine; and an exhaust member which discharges the exhaust gas that is discharged from the purification processing device, to an atmosphere, wherein the exhaust member has: a first exhaust part which protrudes from the bonnet to one side in a vehicle-width direction; a second exhaust part which communicates with an end part of the first exhaust part, and is disposed in an up-and-down direction of the vehicle-body; and a third exhaust part which communicates with an end part of the second exhaust part, and protrudes to the one side in the vehicle-width direction, and a height of an exhaust port of the third exhaust part is lower than a height of a floor of an operator seat.

3 Claims, 21 Drawing Sheets

(56) References Cited

U.S. PATENT DOCUMENTS

| | | | |
|---|---|---|---|
| D698,831 S * | 2/2014 | Adamson et al. | D15/28 |
| 8,695,748 B2 * | 4/2014 | Togo et al. | 180/309 |
| 8,851,224 B2 * | 10/2014 | Hayashi et al. | 180/309 |
| 8,905,182 B2 * | 12/2014 | Masumoto et al. | 180/309 |
| 8,960,359 B2 * | 2/2015 | Nogami et al. | 180/309 |
| 8,997,915 B2 * | 4/2015 | Hayashi et al. | 180/309 |
| 9,027,697 B2 * | 5/2015 | Kobayashi et al. | 180/309 |
| 9,067,157 B2 * | 6/2015 | Shimizu et al. | |
| 2007/0056495 A1 * | 3/2007 | Tsumiyama et al. | 114/55.53 |
| 2008/0168764 A1 * | 7/2008 | Recker et al. | 60/297 |
| 2010/0186395 A1 * | 7/2010 | Yang et al. | 60/311 |
| 2011/0272202 A1 * | 11/2011 | Kawashiri et al. | 180/69.21 |
| 2011/0283687 A1 * | 11/2011 | Dobler et al. | 60/299 |
| 2013/0186077 A1 | 7/2013 | Morimoto et al. | |
| 2013/0213725 A1 * | 8/2013 | Togo et al. | 180/309 |
| 2013/0256054 A1 * | 10/2013 | Nogami et al. | 180/309 |
| 2014/0020972 A1 * | 1/2014 | Masumoto et al. | 180/309 |
| 2014/0083791 A1 * | 3/2014 | Togo | 180/309 |
| 2014/0251713 A1 * | 9/2014 | Aoyama et al. | 180/309 |
| 2014/0353058 A1 * | 12/2014 | Shimizu et al. | 180/69.4 |

FOREIGN PATENT DOCUMENTS

| | | |
|---|---|---|
| JP | H11-078547 A | 3/1999 |
| JP | 2009052411 A | 3/2009 |

OTHER PUBLICATIONS

European Patent Office R. 70 Communication dated May 6, 2015, for EP 14189770.

* cited by examiner

WORKING VEHICLE

BACKGROUND OF THE INVENTION

1. Field of the Invention

The present invention relates to a working vehicle.

2. Related Art of the Invention

Known is a conventional working vehicle such that a cabin is installed on the driving part, and that a muffler main-body is installed inside the bonnet of the vehicle-body front part (for example, refer to Japanese Patent Application Publication No. Hei 11-078547). For this working vehicle the exhaust gas pipe, which discharges exhaust from the muffler main-body to the vehicle-body outer part, is disposed in a standing manner in the neighborhood of the pole of the cabin.

SUMMARY OF THE INVENTION

Now, a working vehicle whose versatility is higher is desired and, on this point, there is room for further progress.

For example, when a working vehicle of a type without a cabin is utilized for working in a plastic house and the like whose ceiling height is low, the exhaust gas pipe sometimes gets stuck to the ceiling and the like.

The present invention furnishes a working vehicle which can improve versatility.

The $1^{st}$ aspect of the present invention is a working vehicle, comprising:

an engine which is housed inside a bonnet of a front part of a vehicle-body;

a purification processing device which performs purification processing of exhaust gas that is discharged from the engine; and an exhaust member which discharges the exhaust gas that is discharged from the purification processing device, to an atmosphere, wherein the exhaust member has: a first exhaust part which protrudes from the bonnet to one side in a vehicle-width direction; a second exhaust part which communicates with an end part of the first exhaust part, and is disposed in an up-and-down direction of the vehicle-body; and a third exhaust part which communicates with an end part of the second exhaust part, and protrudes to the one side in the vehicle-width direction, and a height of an exhaust port of the third exhaust part is lower than a height of a floor of an operator seat.

The $2^{nd}$ aspect of the present invention is a working vehicle according to the $1^{st}$ aspect of the present invention, comprising a protection cover which covers the first exhaust part, the second exhaust part and the third exhaust part.

The $3^{rd}$ aspect of the present invention is a working vehicle according to the $1^{st}$ aspect of the present invention, comprising a bracket which connects the third exhaust part to the vehicle-body.

The $4^{th}$ aspect of the present invention is a working vehicle according to the $1^{st}$ aspect of the present invention, wherein the second exhaust part is arranged so as to be along an end part line of the bonnet at a rear side.

A working vehicle of the present invention can improve versatility.

Figure 1:
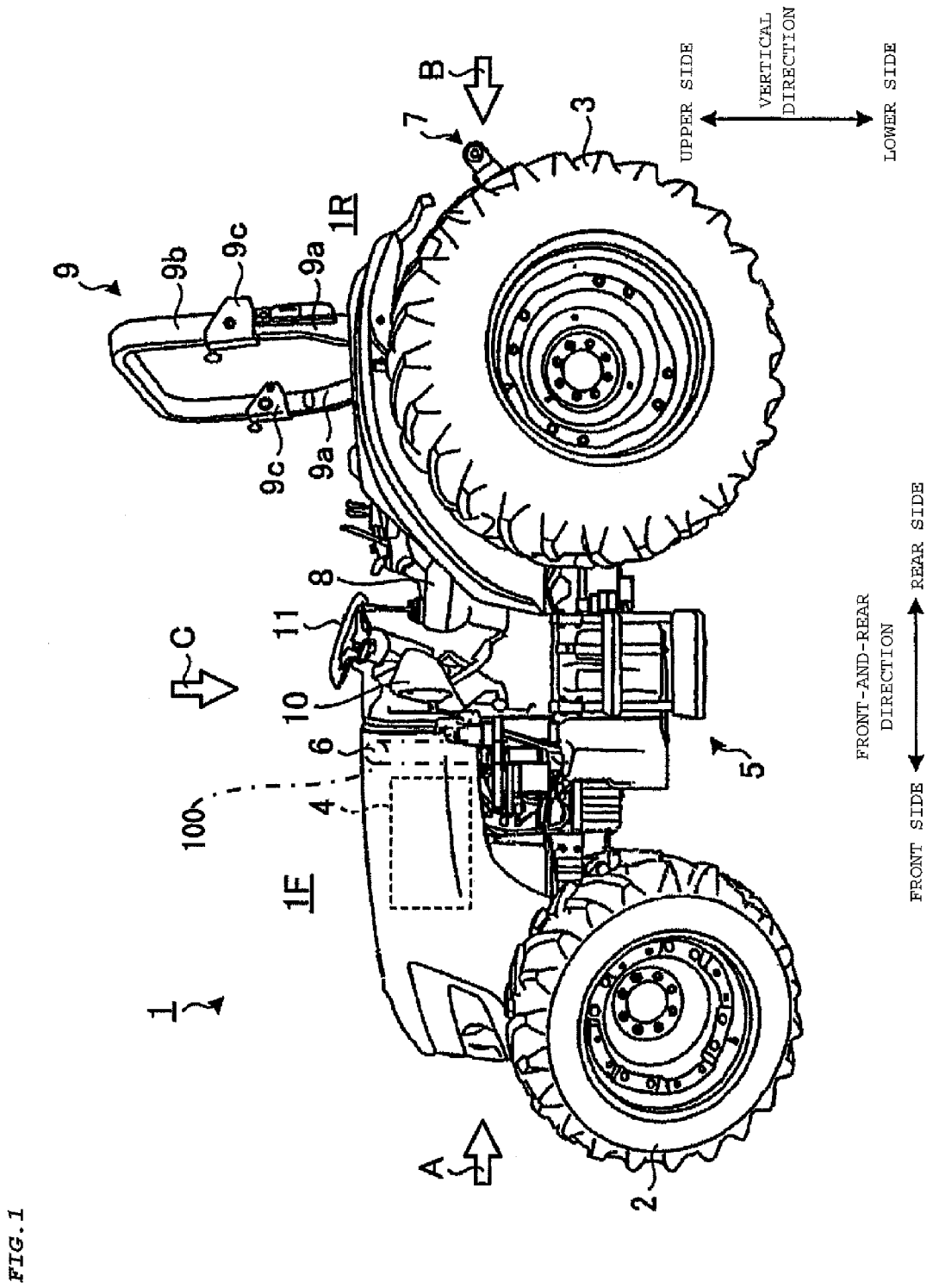
FIG. 1 is a schematic view of the tractor related to an embodiment of the present invention.

DESCRIPTION OF SYMBOLS 1 tractor (working vehicle)
1F vehicle-body front part 4 engine
6 bonnet
6a end part line
8 operator seat
9 safety frame
12 fuel tank
13 floor
100 exhaust gas pipe (exhaust member)
101 first exhaust part
102 second exhaust part
103 third exhaust part
103a, 106a exhaust port
104 bracket
104a pipe bracket
104b tank bracket
105 protection cover
105a first cover
105b second cover
105c third cover
106 extending pipe

DETAILED DESCRIPTION OF THE INVENTION

In the following, an embodiment related to the present invention is described in detail based on the drawings. Additionally, this invention is not limited by this embodiment. Moreover, as elements in the below-mentioned embodiments, elements which are able to be replaced and easily replaced by a person skilled in the art, and elements which are substantially identical are included.

Embodiment

Figure 2:
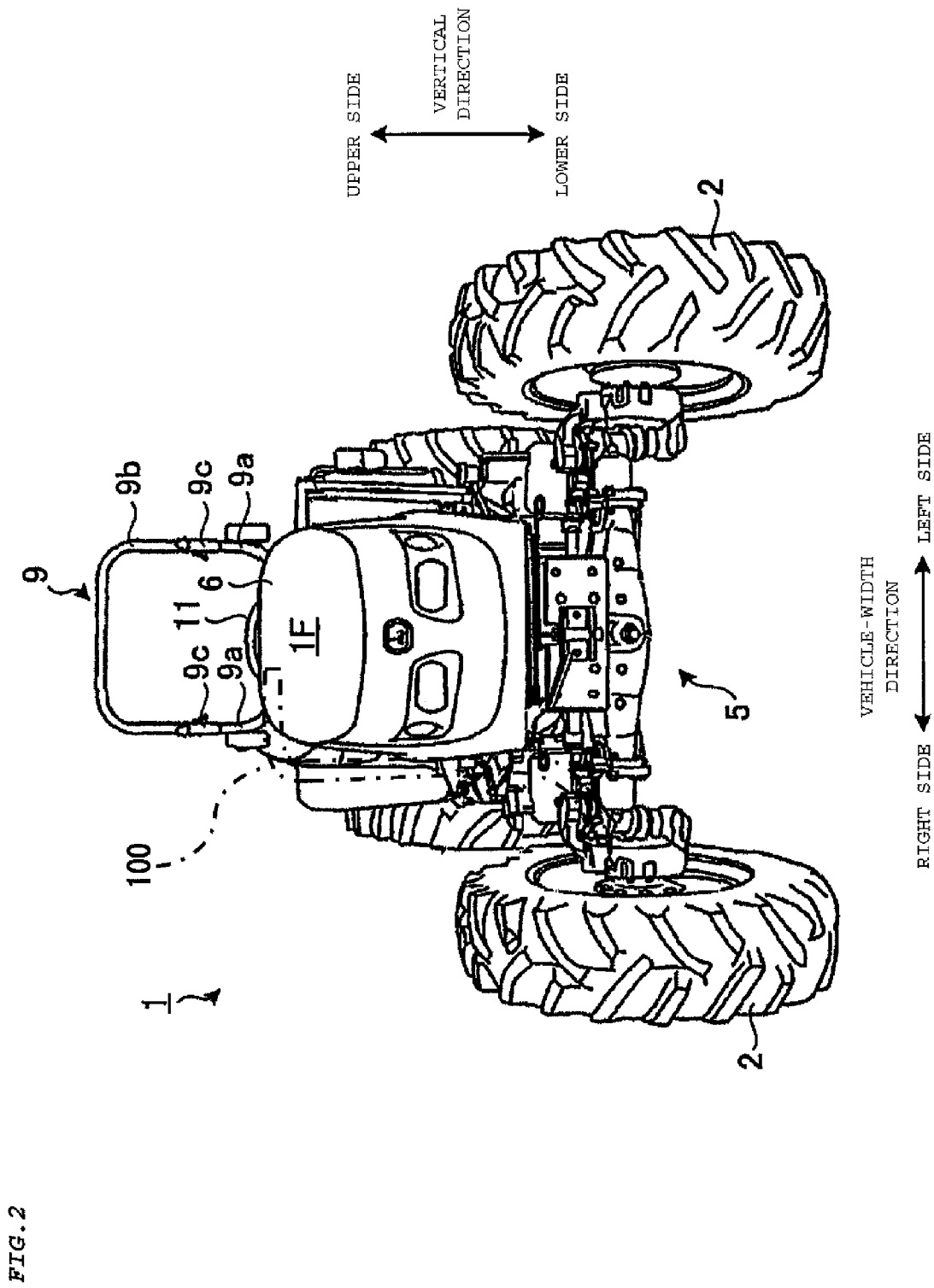
FIG. 2 is an arrow view of the tractor related to an embodiment of the present invention (a view such that the vehicle-body front part is viewed from the direction of the arrow A of FIG. 1)
Figure 3:
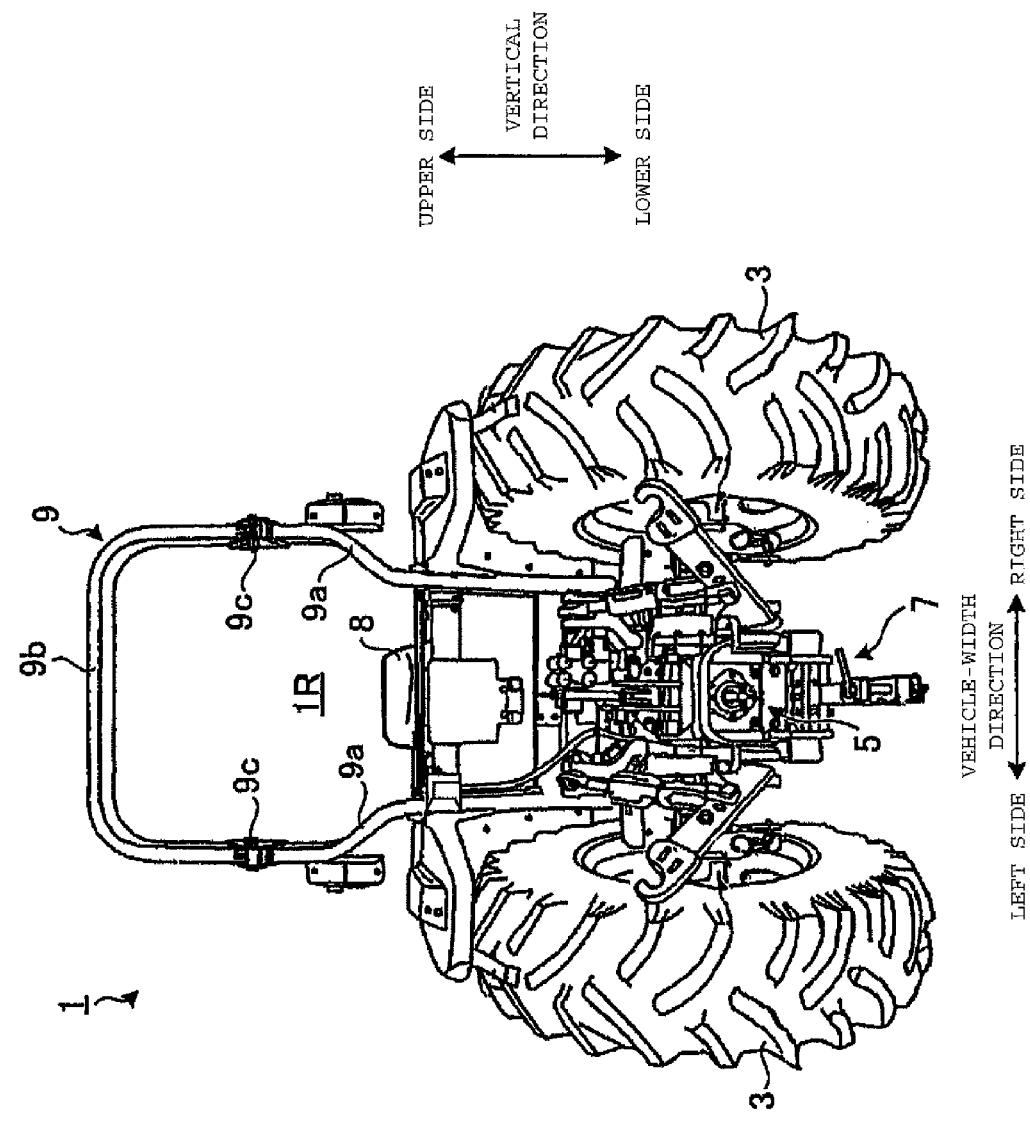
FIG. 3 is an arrow view of the tractor related to an embodiment of the present invention (a view such that the vehicle-body rear part is viewed from the direction of the arrow B of FIG. 1)
Figure 4:
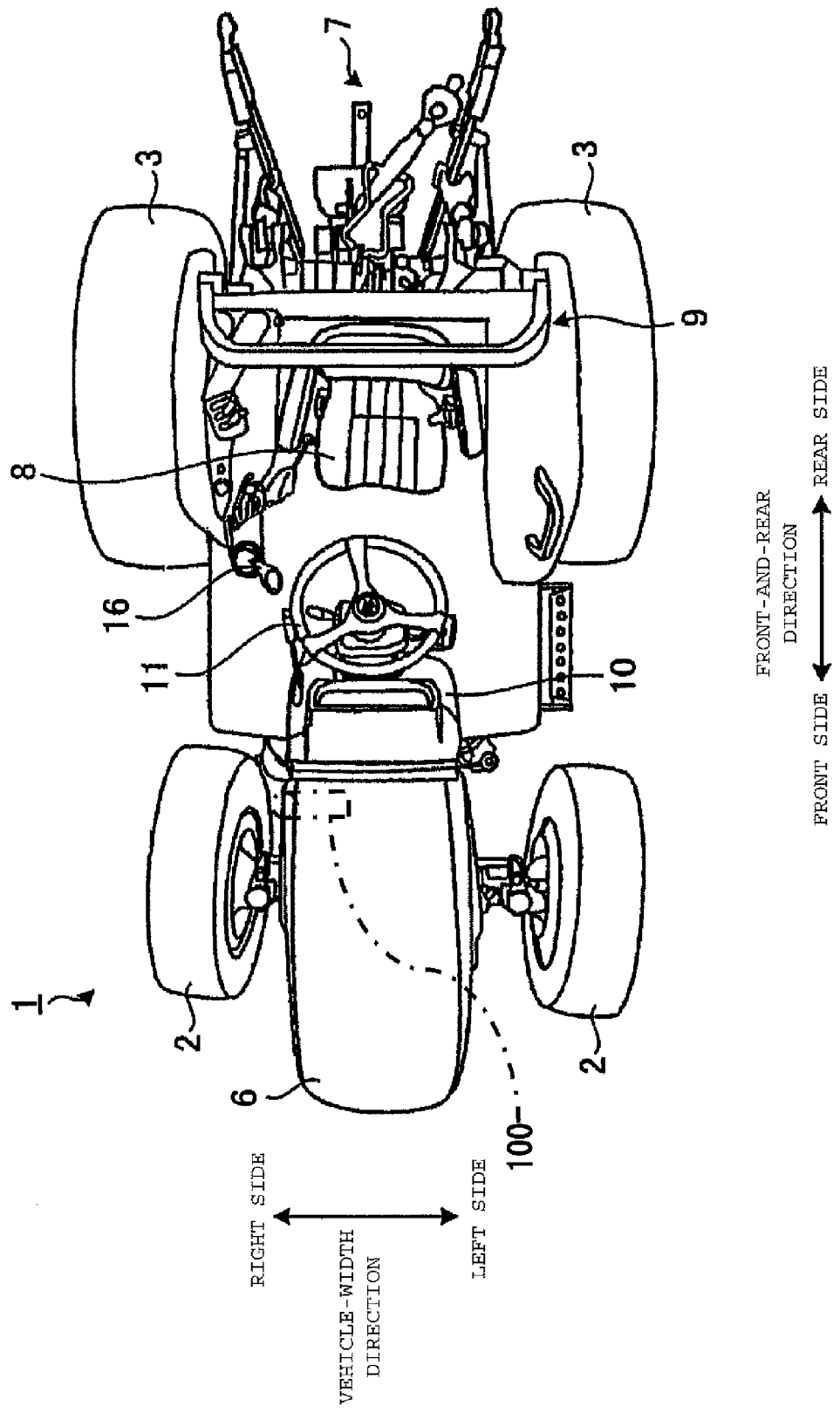
FIG. 4 is an arrow view of the tractor related to an embodiment of the present invention (a view such that the vehicle-body upper part is viewed from the direction of the arrow C of FIG. 1)
Figure 5:
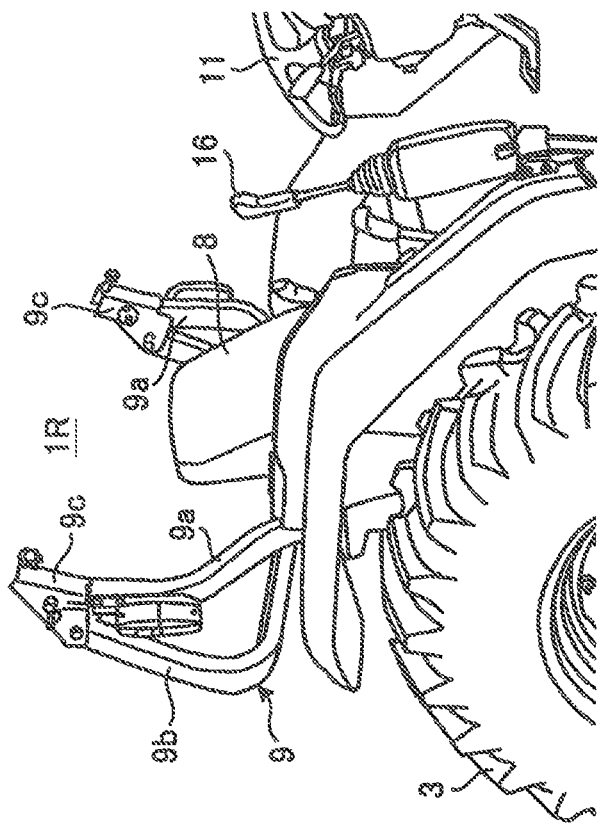
FIG. 5 is a portion perspective view of a neighborhood of the rotation supporting part of the safety frame of the tractor related to an embodiment of the present invention.
Figure 6:
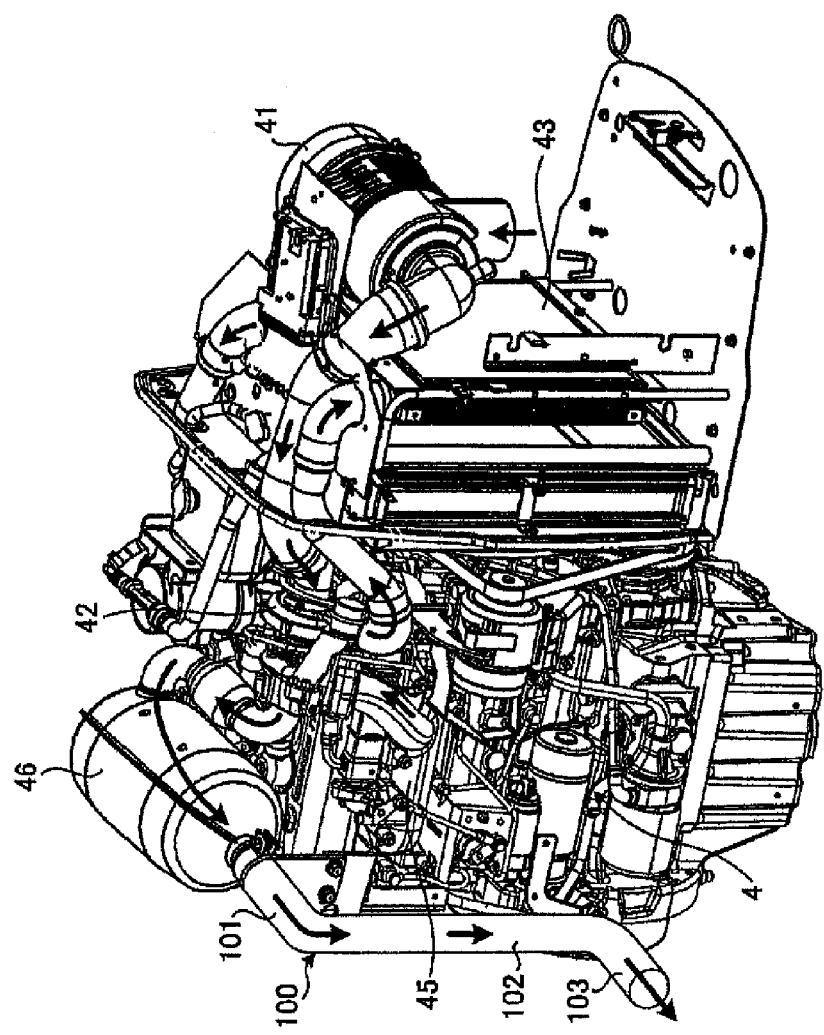
FIG. 6 is a perspective view of a neighborhood of the engine of the tractor related to an embodiment of the present invention.
Figure 7:
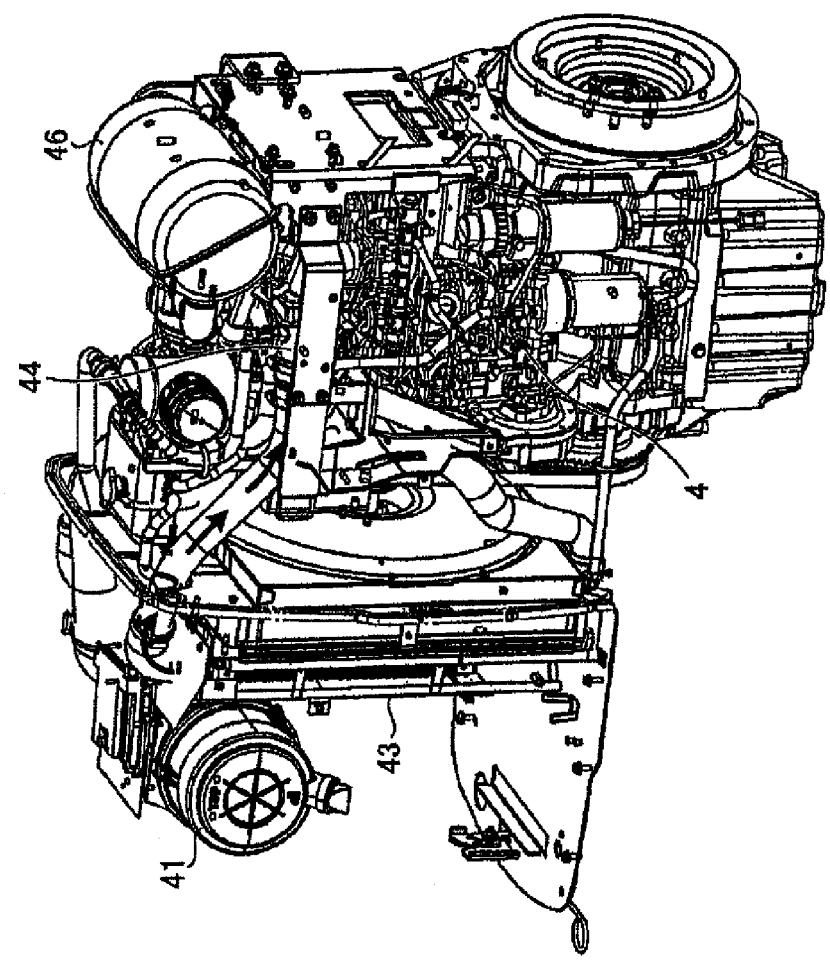
FIG. 7 is a perspective view of a neighborhood of the engine of the tractor related to an embodiment of the present invention.
Figure 8:
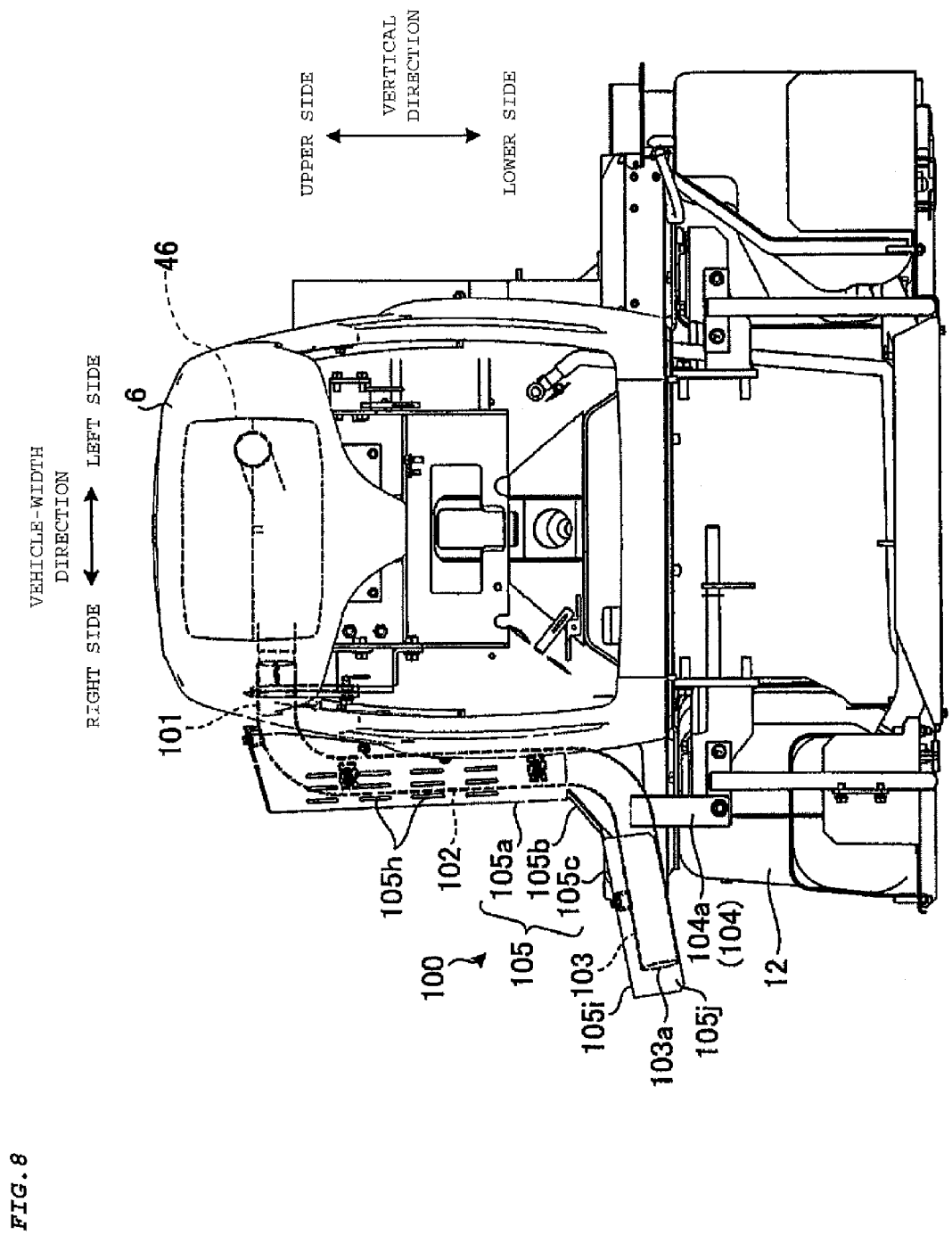
FIG. 8 is a view such that the bonnet and exhaust gas pipe of the tractor related to an embodiment of the present invention is viewed from the front side in the front-and-rear direction.
Figure 9:
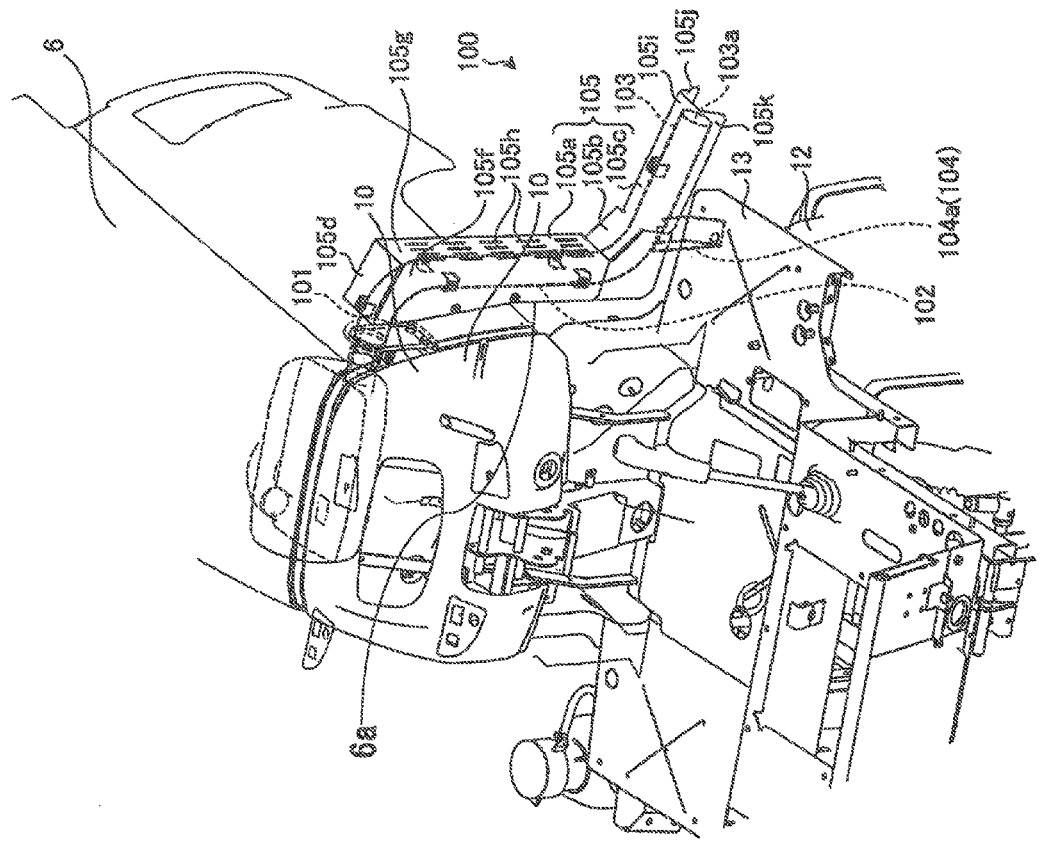
FIG. 9 is a portion perspective view such that the bonnet and exhaust gas pipe of the tractor related to an embodiment of the present invention is viewed downward from the upper right in the vehicle-width direction.
Figure 10:
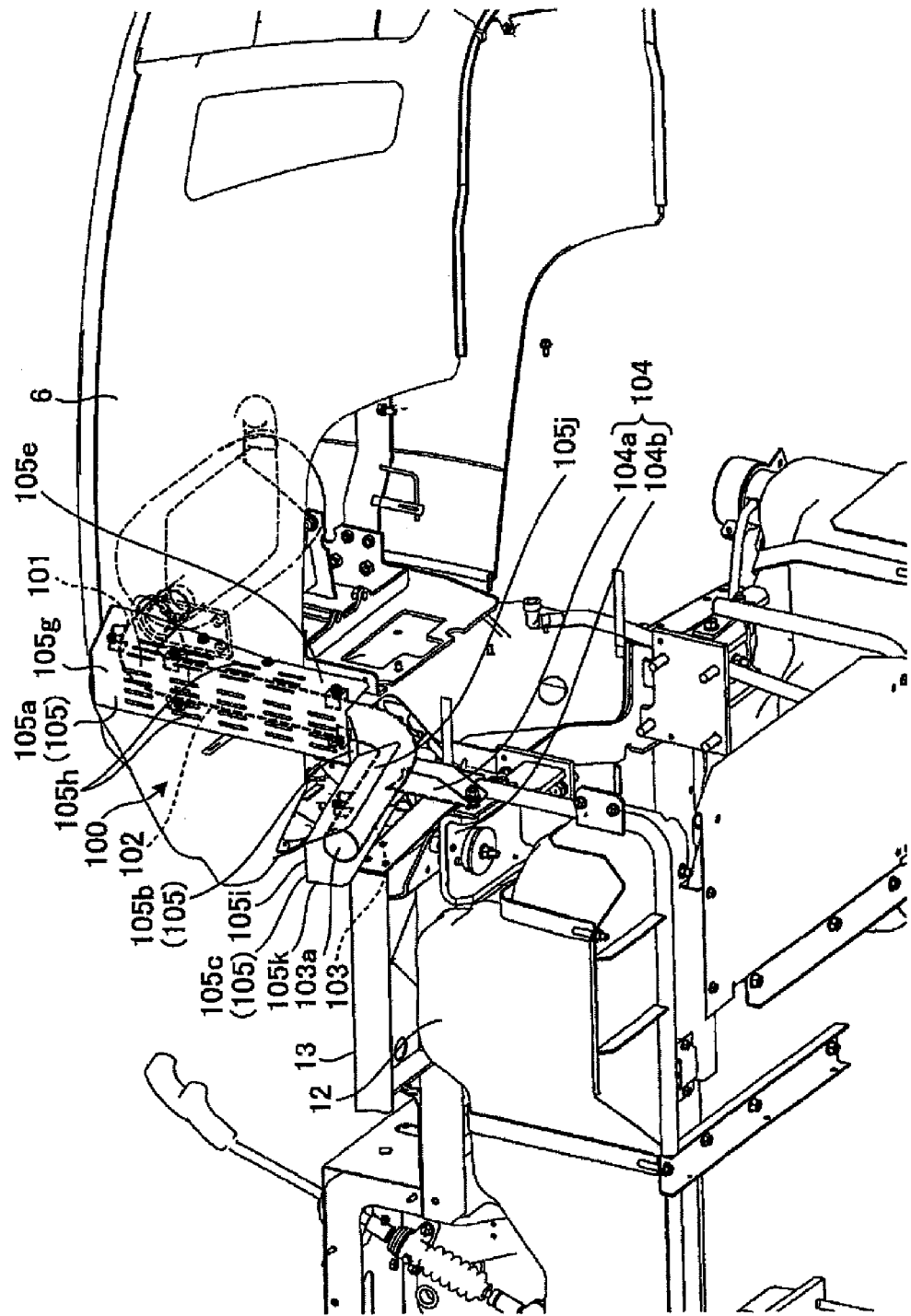
FIG. 10 is a portion perspective view such that the bonnet and exhaust gas pipe of the tractor related to an embodiment of the present invention is viewed upward from the lower right in the vehicle-width direction.
Figure 11:
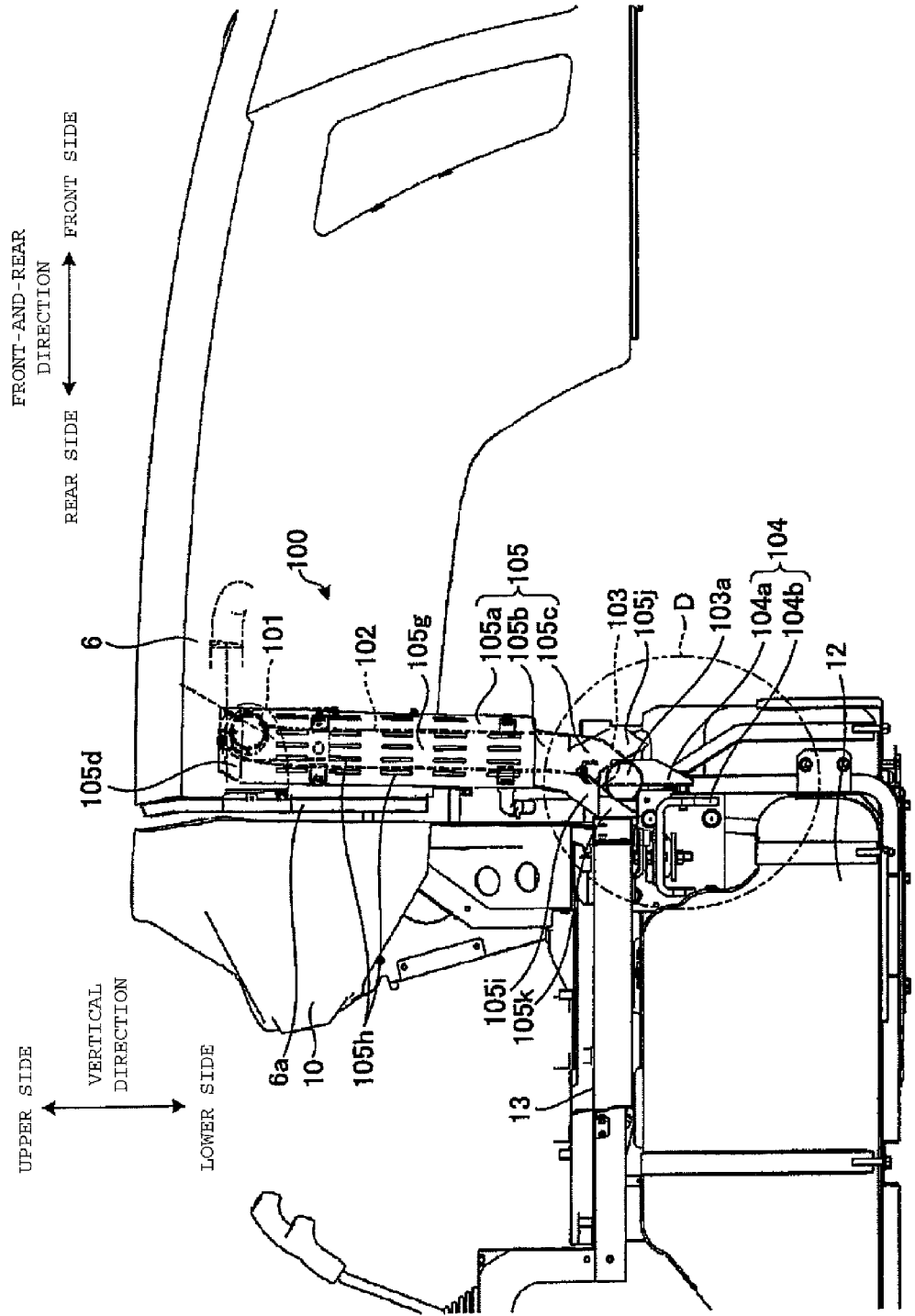
FIG. 11 is a view such that the bonnet and exhaust gas pipe of the tractor related to an embodiment of the present invention is viewed from the right side in the vehicle-width direction.
Figure 12:
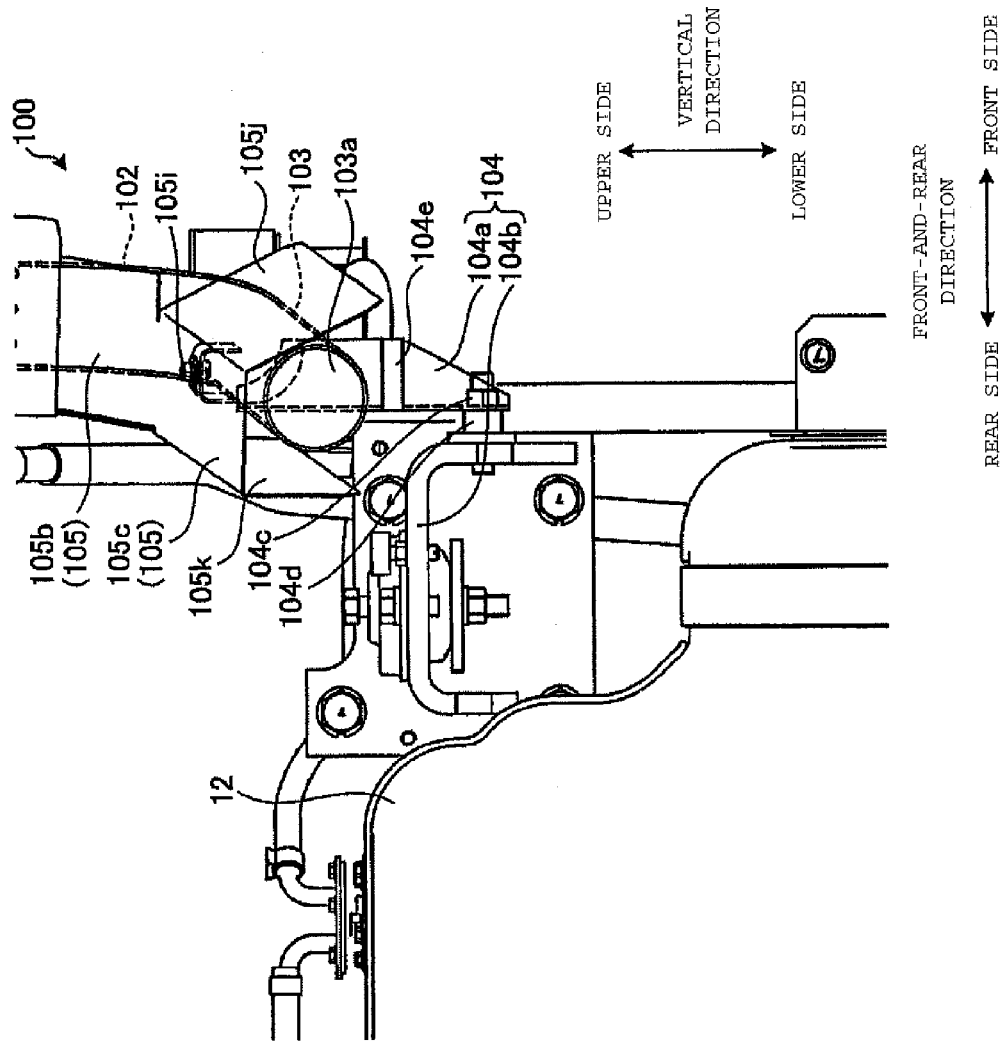
FIG. 12 is a portion side view of the portion inside the encircling line D of FIG. 11 of the tractor related to an embodiment of the present invention.
Figure 13:
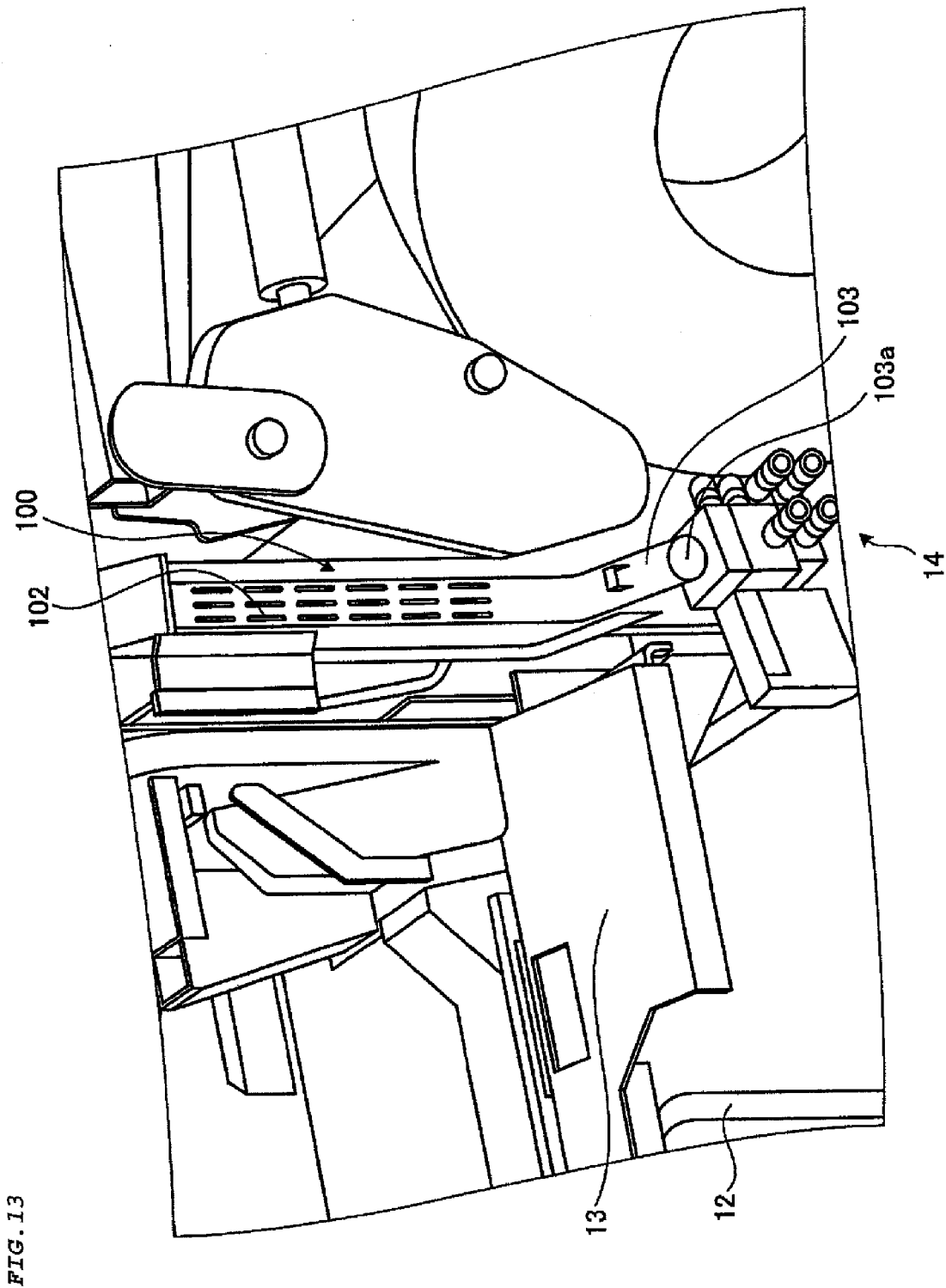
FIG. 13 is a portion perspective view of a neighborhood of the exhaust port of the exhaust gas pipe of the tractor related to an embodiment of the present invention.
Figure 14:
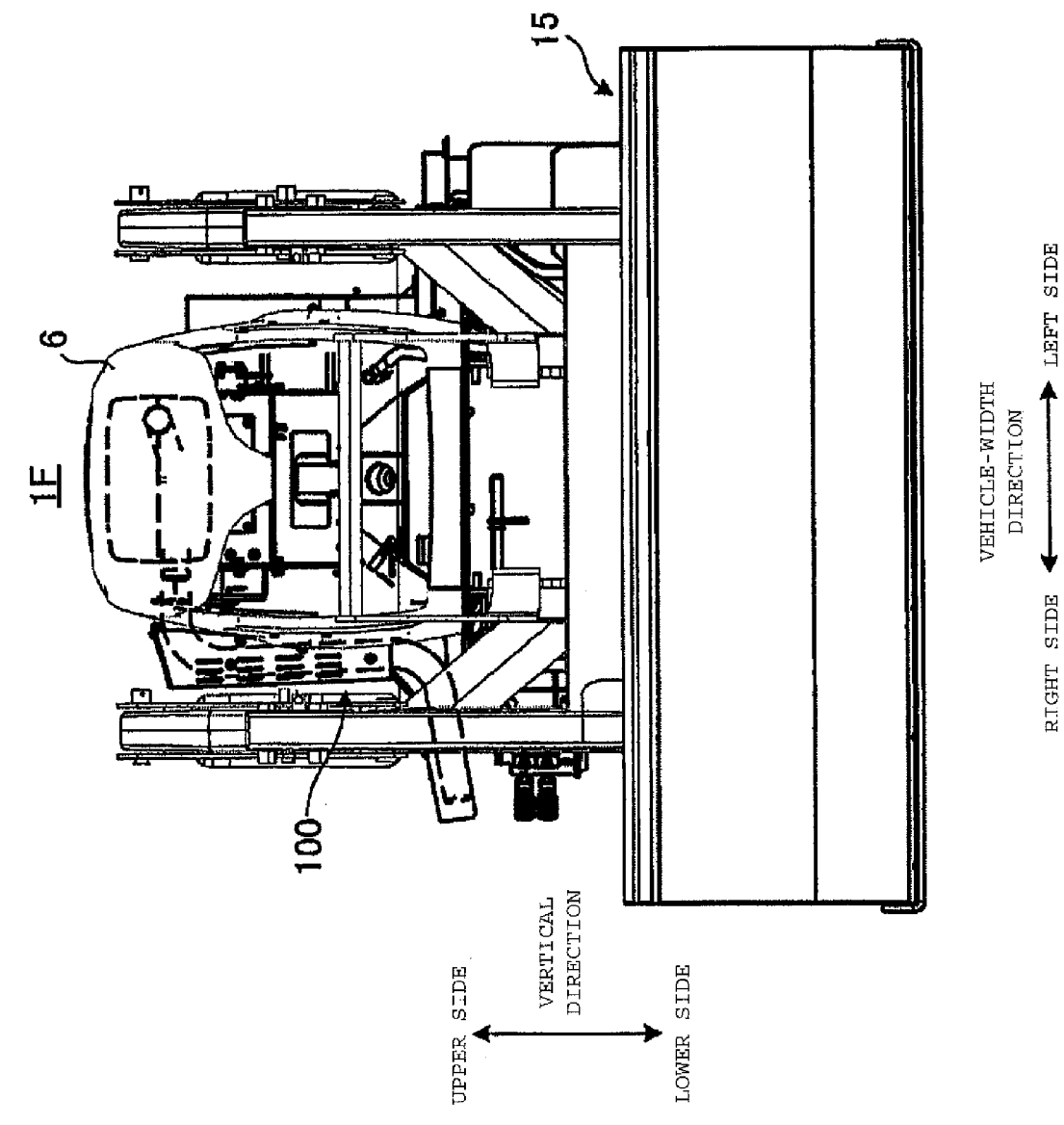
FIG. 14 is a front view of the loader of the tractor related to an embodiment of the present invention.
Figure 15:
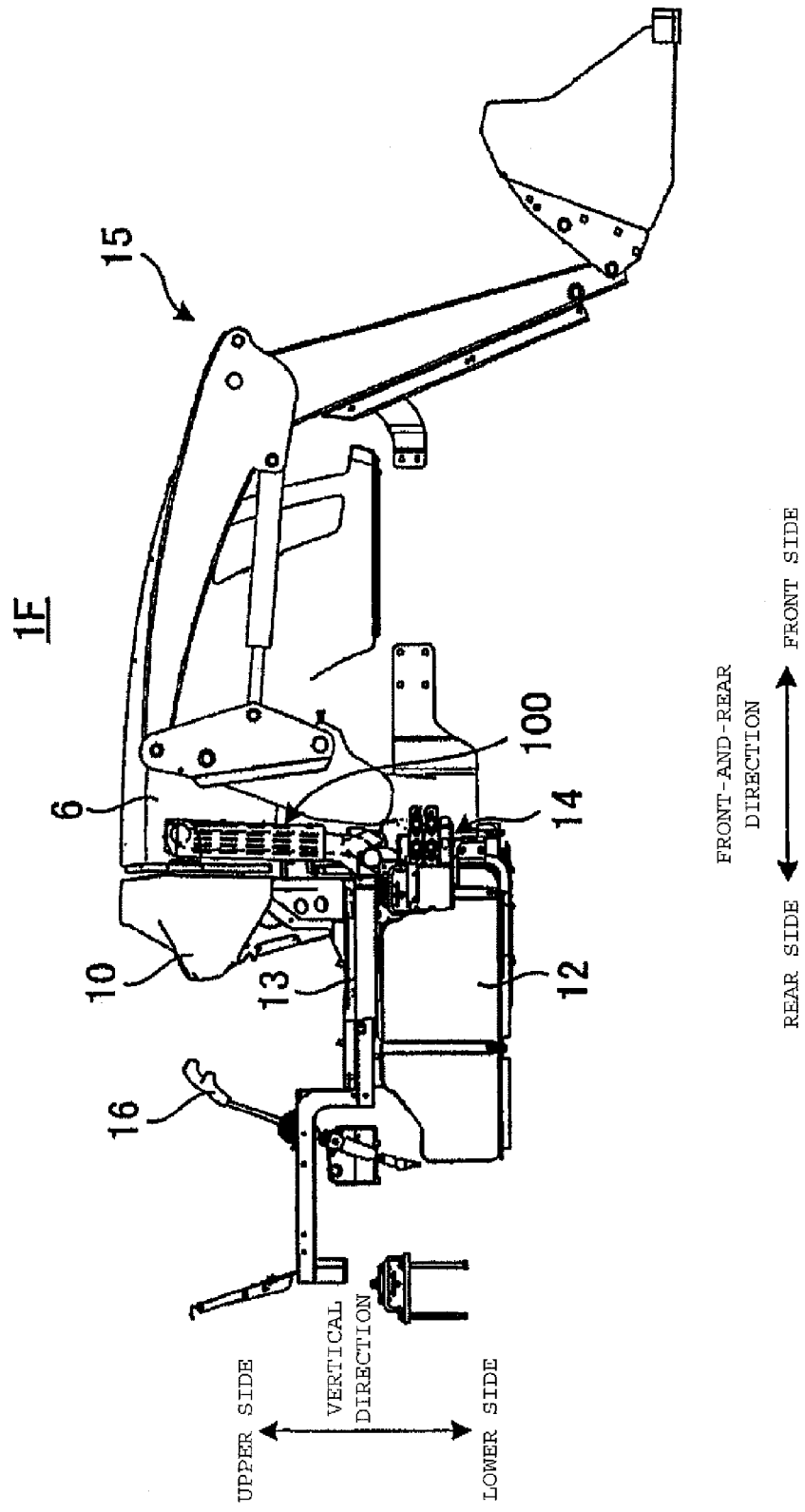
FIG. 15 is a side view of the loader of the tractor related to an embodiment of the present invention.
Figure 16:
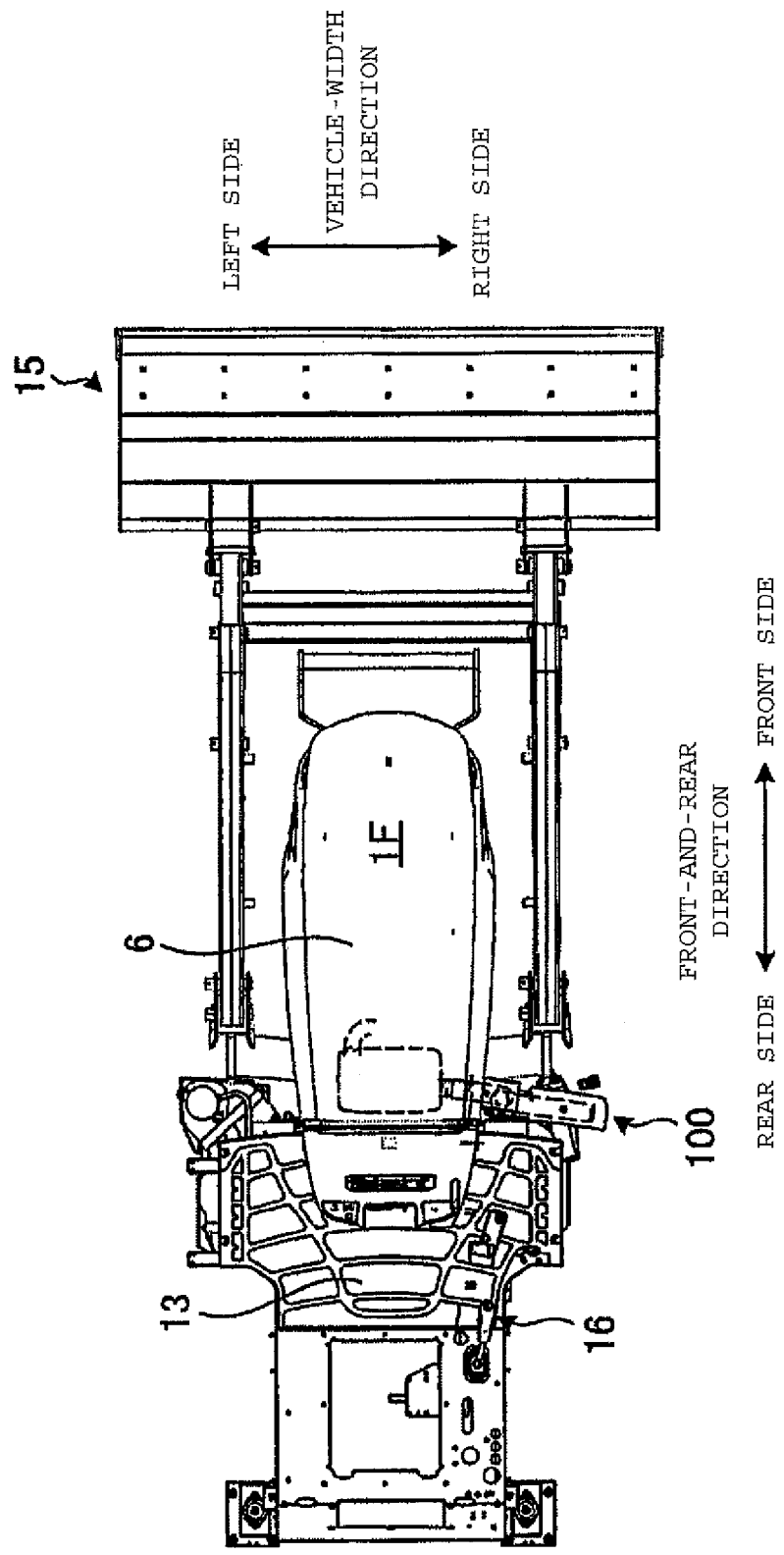
FIG. 16 is a plan view of the loader of the tractor related to an embodiment of the present invention.
Figure 17:
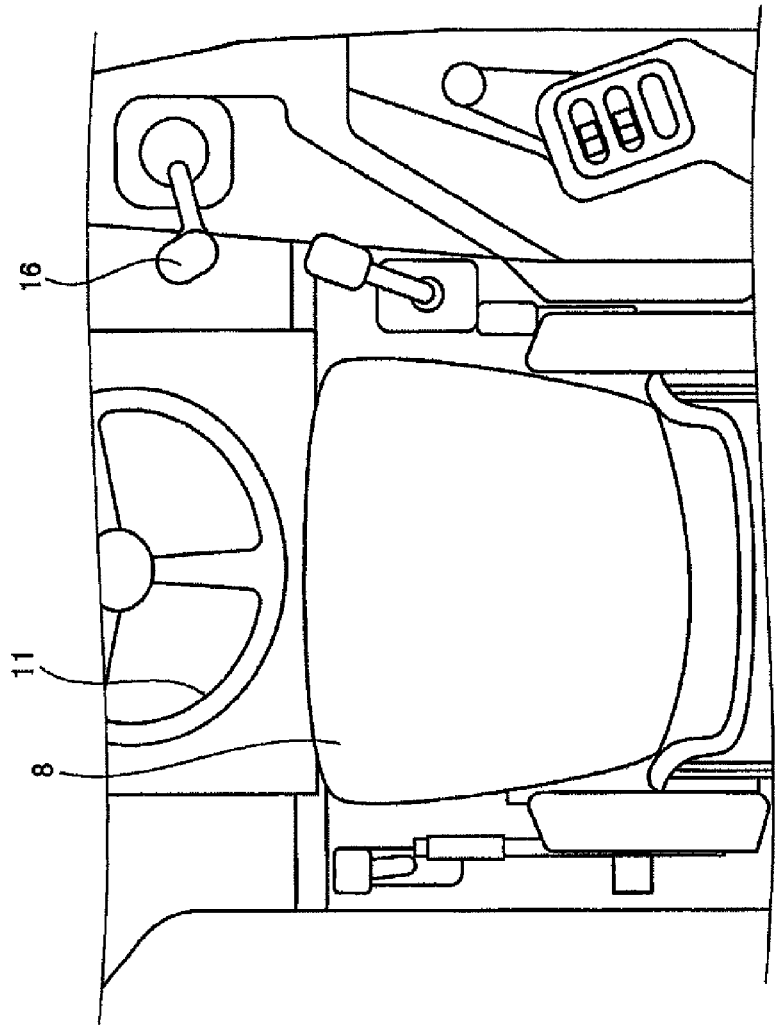
FIG. 17 is a portion plan view of a neighborhood of the operator seat of the tractor related to an embodiment of the present invention.
Figure 18:
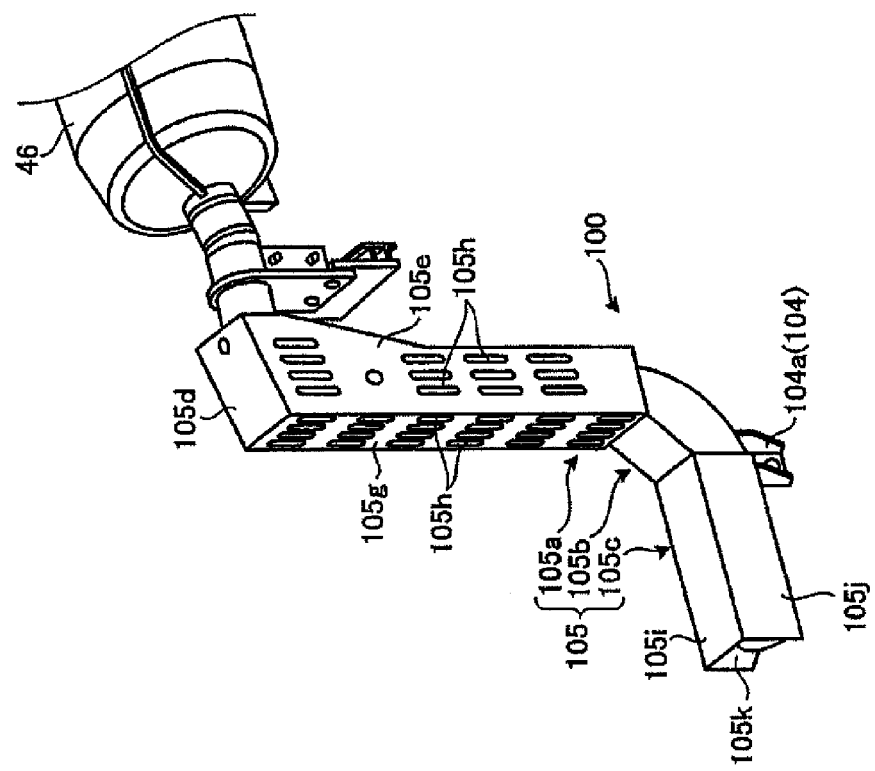
FIG. 18 is a portion perspective view of a neighborhood of the protection cover of the tractor related to an embodiment of the present invention.
Figure 19:
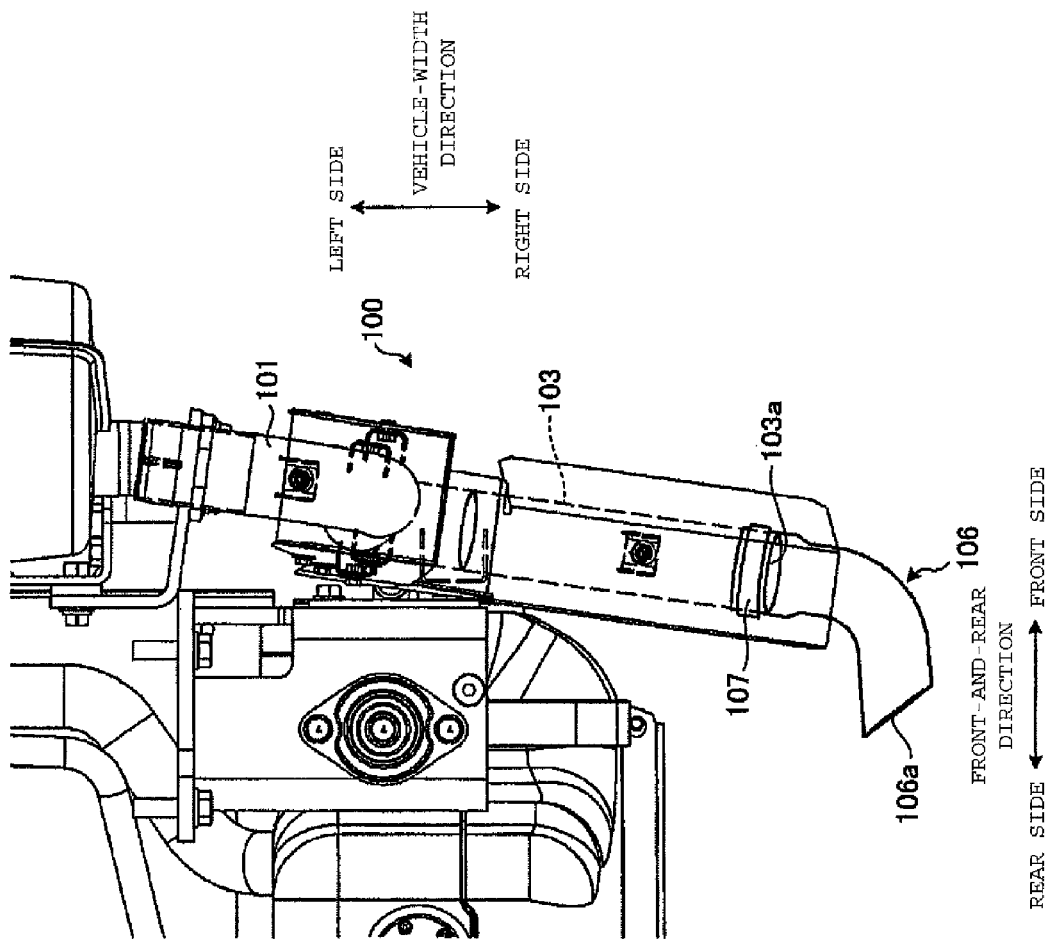
FIG. 19 is a portion plan view of a neighborhood of the extending pipe of the tractor related to an embodiment of the present invention.
Figure 20:
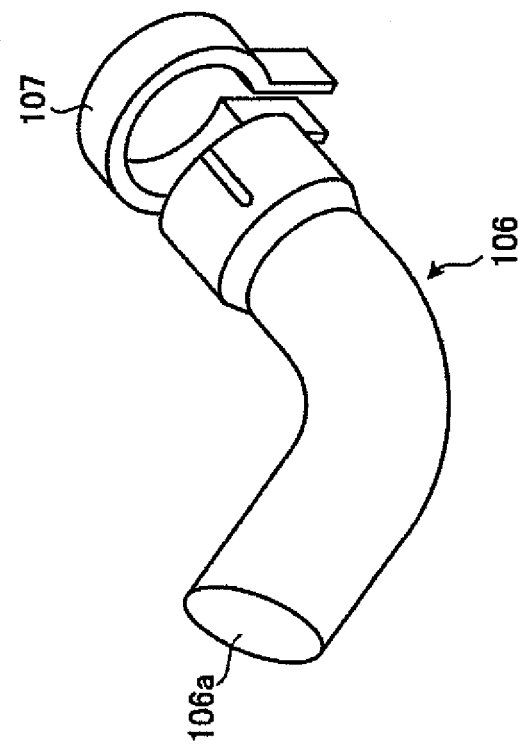
FIG. 20 is a schematic perspective view of the extending pipe of the tractor related to an embodiment of the present invention.
Figure 21:
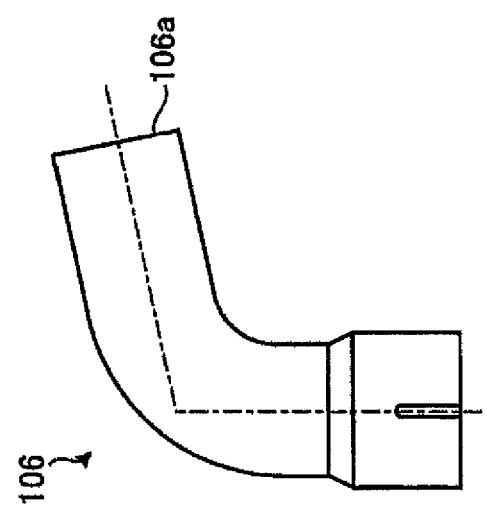
FIG. 21 is a plan view which represents another example of the extending pipe of the tractor related to an embodiment of the present invention.

FIG. 1 is a schematic view of the tractor related to the embodiment. FIG. 2 is an arrow view of the tractor related to the embodiment (a view such that the vehicle-body front part is viewed from the direction of the arrow A of FIG. 1). FIG. 3 is an arrow view of the tractor related to the embodiment (a view such that the vehicle-body rear part is viewed from the direction of the arrow B of FIG. 1). FIG. 4 is an arrow view of the tractor related to the embodiment (a view such that the vehicle-body upper part is viewed from the direction of the arrow C of FIG. 1). FIG. 5 is a portion perspective view of a neighborhood of the rotation supporting part of the safety frame of the tractor related to the embodiment. FIGS. 6 and 7 are perspective views of a neighborhood of the engine of the tractor related to the embodiment. FIG. 8 is a view such that the bonnet and exhaust gas pipe of the tractor related to the embodiment is viewed from the front side in the front-and-rear direction. FIG. 9 is a portion perspective view such that the bonnet and exhaust gas pipe of the tractor related to the embodiment is viewed downward from the upper right in the vehicle-width direction. FIG. 10 is a portion perspective view such that the bonnet and exhaust gas pipe of the tractor related to the embodiment is viewed upward from the lower right in the vehicle-width direction. FIG. 11 is a view such that the bonnet and exhaust gas pipe of the tractor related to the embodiment is viewed from the right side in the vehicle-width direction. FIG. 12 is a portion side view of the portion inside the encircling line D of FIG. 11 of the tractor related to the embodiment. FIG. 13 is a portion perspective view of a neighborhood of the exhaust port of the exhaust gas pipe of the tractor related to the embodiment. FIG. 14 is a front view of the loader of the tractor related to the embodiment. FIG. 15 is a side view of the loader of the tractor related to the embodiment. FIG. 16 is a plan view of the loader of the tractor related to the embodiment. FIG. 17 is a portion plan view of a neighborhood of the operator seat of the tractor related to the embodiment. FIG. 18 is a portion perspective view of a neighborhood of the protection cover of the tractor related to the embodiment. FIG. 19 is a portion plan view of a neighborhood of the extending pipe of the tractor related to the embodiment. FIG. 20 is a schematic perspective view of the extending pipe of the tractor related to the embodiment. FIG. 21 is a plan view which represents another example of the extending pipe of the tractor related to the embodiment.

Additionally, in the following description, the front-and-rear direction is the front-and-rear direction of the tractor 1. More specifically, the front-and-rear direction is the movement direction on the occasion when this tractor 1 moves straight on, the frontward side in the movement direction is said to be the front side in the front-and-rear direction, and the rearward side the rear side in the front-and-rear direction. The movement direction of the tractor 1 is the direction from the operator seat 8 of the tractor 1 towards the steering handle 11 at the time when the tractor 1 moves straight on, the side of the steering handle 11 becomes the front side, and the side of the operator seat 8 the rear side. Moreover, the vehicle-width direction is the direction which is orthogonal to the front-and-rear direction in a horizontal face. In the present embodiment, the right side in a state where the front side in the front-and-rear direction is viewed is said to be the right side in the vehicle-width direction, and the left side in a state where the front side in the front-and-rear direction is viewed the left side in the vehicle-width direction. Further, the vertical direction is the direction which is orthogonal to the front-and-rear direction and the vehicle-width direction. These front-and-rear direction, vehicle-width direction and vertical direction are orthogonal to each other.

The tractor 1 of the present embodiment shown in FIGS. 1-4 as a working vehicle is a working vehicle such as an agricultural tractor or the like, which performs working in a farm field or the like, while running on its own by the motive force the motive force source generates. The tractor 1 comprises: the front wheels 2; the rear wheels 3; the engine 4 as a motive force source; and the speed-changing device (the transmission) 5. The front wheels 2 are disposed as wheels which are mainly for steerage, namely, steered wheels. The rear wheels 3 are disposed as wheels which are mainly for drive, namely, driven wheels. To the rear wheels 3, the rotary motive force generated at the engine 4, which is housed and loaded inside the bonnet (the hood) 6 of the vehicle-body front part 1F, is able to be transmitted with appropriate reduction in speed at the speed-changing device (the transmission) 5, and the rear wheels 3 generate drive force by this rotary motive force. Moreover, this speed-changing device 5 is able to transmit the rotary motive force, generated at the engine 4, also to the front wheels 2 as necessary and, in this case, the four wheels of the front wheels 2 and rear wheels 3 become driven wheels and generate drive force. Namely, for the speed-changing device 5, switching between two-wheel drive and four-wheel drive is able to be carried out, the rotary motive force of the engine 4 is reduced in speed, and the rotary motive force which has been reduced in speed is able to be transmitted to the front wheels 2 and the rear wheels 3. Moreover, at the vehicle-body rear part 1R, the connecting device 7 is disposed on which an implement such as a rotary cultivator (not shown) or the like is able to be installed. The tractor 1 of the present embodiment, whose surrounding of the operator seat 8 on the vehicle-body is opened, is a tractor of a safety frame type which has the safety frame (the ROPS, i.e. the Roll Over Protective Structure) 9 at the vehicle-body rear part 1R. The safety frame 9 is a structure-body which ensures safety at the time of overturning. From the dashboard 10 at the front side of the operator seat 8 the steering handle 11 is disposed in a standing manner and, around the operator seat 8, various manipulation pedals such as the clutch pedal, the brake pedal, the accelerator pedal and the like, and various manipulation levers such as the frontward/rearward movement lever, the speed-changing lever and the like are arranged.

Here, the safety frame 9 of the tractor 1 of the present embodiment is, as shown in FIGS. 1 and 5, able to be folded. The safety frame 9 is able to rotate to the upright position exemplified in FIG. 1, or to the folding-and-compactifying position exemplified in FIG. 5. Specifically, the safety frame 9 is configured to include: the base end frames 9a; the horizontal frame 9b; and the rotation supporting parts 9c, and is a roughly U-shaped frame such that, in a state of the upright position (refer to FIG. 1), the lower side in the vertical direction is opened as a whole. The base end frames 9a are frames which configure the base end parts of the safety frame 9. The base end frames 9a are fixed to the back face side of the operator seat 8, in the vehicle-body rear part 1R. The base end frames 9a are disposed in a standing manner along the vertical direction in a left-and-right pair with respect to the vehicle-width direction. The horizontal frame 9b is disposed so as to be laid on the vertical direction upper end parts of the paired base end frames 9a, along the horizontal direction (the vehicle-width direction). For the horizontal frame 9b, at the both ends of the horizontal portion the bending parts which are bent roughly towards the lower side in the vertical direction are formed, and each bending part is connected to each vertical direction upper end part of the paired base end frames 9a via each rotation supporting part 9c. Each rotation supporting part 9c supports each bending part of the horizontal frame 9b rotatably with respect to each base end frame 9a. Each rotation supporting part 9c supports each bending part of the horizontal frame 9b, so that each bending part is able to rotate, with the center being the axis which is disposed along the vehicle-width direction. As shown in FIG. 1, in a state of the upright position, a pin or the like is engaged so as to go through a part of each rotation supporting part 9c and each bending part of the horizontal frame 9b, thereby the horizontal frame 9b can be held at the upright position, and the safety frame 9 can be held in a roughly U-shaped state where the lower side in the vertical direction is opened as a whole. On the other hand, the above-mentioned pin or the like is pulled out, as shown in FIG. 5, the horizontal frame 9b is allowed to rotate so as to be pushed down from the upright position to the rear side in the front-and-rear direction, and thereby the safety frame 9 can be allowed to rotate to the folding-and-compactifying position.

Like this, on the occasion when the tractor 1 which has the safety frame 9 of a folding type passes, for example, a plastic house inside, its exit-and-entrance and the like, where the ceiling height is low, by folding the safety frame 9 with the folding-and-compactifying position, working at places where the ceiling height is low is able to be carried out.

And, for the tractor 1 of the present embodiment, as shown in FIGS. 6-21, in the exhaust system of the tractor 1 which has the safety frame 9 of a folding type as mentioned above, the exhaust gas pipe 100 as an exhaust member is arranged at a predetermined position. By means of this, for example, it is suppressed that the exhaust gas pipe 100 gets stuck to the ceiling and the like at places where the ceiling height is low as mentioned above, working at places where the ceiling height is low is enabled to be carried out, and versatility is allowed to be improved.

Here, referring to FIGS. 6 and 7, descriptions are given regarding the intake-and-exhaust system of the engine 4 of the tractor 1.

The intake system of the engine 4 of the tractor 1 is a system which supplies air to the combustion chambers of the engine 4, and is a system where air which is inhaled to the combustion chambers of the engine 4 flows. The intake system of the engine 4 is configured to include the air cleaner 41, the compressor of the turbocharger 42, the intercooler 43, the intake manifold 44 and the like. In the intake system of the engine 4, from the upstream side of the intake direction (the direction in which intake air flows), the air cleaner 41, the compressor of the turbocharger 42, the intercooler 43 and the intake manifold 44 are arranged in this order, and are mutually connected by the intake tubes (intake pipes) and the like. Air which is supplied via the intake system of the engine 4 to the engine 4 is, for a start, inhaled via the air cleaner 41, is supercharged in the compressor of the turbocharger 42, is cooled at the intercooler 43, and is supplied via the intake manifold 44 to each combustion chamber.

The exhaust system of the engine 4 of the tractor 1 is a system which performs predetermined processing with respect to an exhaust gas such that the gaseous mixture of fuel and air has combusted in the combustion chambers of the engine 4, and discharges the exhaust gas to the atmosphere, and is a system where exhaust gas which is discharged from the combustion chambers of the engine 4 flows. The exhaust system of the engine 4 is configured to include the exhaust manifold 45, the turbine of the turbocharger 42, the DOC (Diesel Oxidation Catalyst)/muffler 46, the above-mentioned exhaust gas pipe 100 and the like. In the exhaust system of the engine 4, from the upstream side of the exhaust direction (the direction in which exhaust gas flows), the exhaust manifold 45, the turbine of the turbocharger 42, the DOC/muffler 46 and the exhaust gas pipe 100 are arranged in this order, and are mutually connected by the exhaust tubes (exhaust pipes) and the like. Exhaust gas which is discharged via the exhaust system of the engine 4 from the engine 4 is introduced from each combustion chamber via the exhaust manifold 45 into the turbine of the turbocharger 42, allows as an operating medium the turbocharger 42 to operate and, with purification processing (exhaust emission control) being performed at the DOC/muffler 46, is discharged via the exhaust gas pipe 100 to the atmosphere.

And, the exhaust gas pipe 100 of the present embodiment is, as shown in FIGS. 6 and 8-11, an exhaust pipe, and has: the first exhaust part 101; the second exhaust part 102; and the third exhaust part 103. The exhaust gas pipe 100 of the present embodiment is disposed at the right side of the bonnet 6 in the vehicle-width direction. The first exhaust part 101 is the first protruding part, which protrudes from the bonnet 6 to one side in the vehicle-width direction or, in the present embodiment, to the right side in the vehicle-width direction. The first exhaust part 101 goes through the wall face at the rear side of the bonnet 6 in the front-and-rear direction, and, at the right side in the vehicle-width direction, along the vehicle-width direction, and the end part at the left side in the vehicle-width direction communicates with the above-mentioned DOC/muffler 46. Additionally, this first exhaust part 101 may pass a portion where the bonnet 6 is cut off. The second exhaust part 102 communicates with the end part of the first exhaust part 101 at one side in the vehicle-width direction or, in the present embodiment, with the end part at the right side in the vehicle-width direction. The second exhaust part 102 is a vertical part which is disposed towards the lower side in the vertical direction. Namely, the second exhaust part 102 is disposed along the vertical direction, and the end part at the upper side in the vertical direction communicates via the bending part, with the end part of the first exhaust part 101 at the right side in the vehicle-width direction. The third exhaust part 103 communicates with the end part of the second exhaust part 102 at the lower side in the vertical direction. The third exhaust part 103 is the second protruding part, which protrudes to one side in the vehicle-width direction or, in the present embodiment, to the right side in the vehicle-width direction. Namely, the third exhaust part 103 is disposed along the vehicle-width direction, and the end part at the left side in the vehicle-width direction communicates via the bending part, with the end part of the second exhaust part 102 at the lower side in the vertical direction. For this exhaust gas pipe 100, exhaust gas from the engine 4 is led with the first exhaust part 101 from the bonnet 6 to the right side in the vehicle-width direction, is guided with the second exhaust part 102 to the lower side in the vertical direction, and is discharged with the third exhaust part 103 to the right side in the vehicle-width direction.

For the exhaust gas pipe 100 of the present embodiment, the first exhaust part 101 is supported at the side of the DOC/muffler 46, and the third exhaust part 103 is supported via the bracket 104 and the like at the fuel tank 12. Here, the fuel tank 12 is a tank, which is disposed under the floor 13 of the operator seat 8 (refer to FIG. 1) and stores up fuel that is supplied to the engine 4. The bracket 104, which supports the third exhaust part 103 at the fuel tank 12, is configured to include: the pipe bracket 104*a* that is fixed to the third exhaust part 103; and the tank bracket 104*b* that is fixed to the fuel tank 12. The pipe bracket 104*a* is, as shown in FIGS. 8, 10 and the like, fixed to the portion which is exposed from the below-mentioned protection cover 105, in the third exhaust part 103 (the method of fixing is not limited particularly). The tank bracket 104*b* is fixed to the face of the fuel tank 12 at the front side in the front-and-rear direction (the method of fixing is not limited particularly). The tank bracket 104*b* is, typically, a rigid part which has a proper vibration characteristic equivalent to that of the engine 4 or the like. And, the pipe bracket 104*a* and the tank bracket 104*b* are, as shown in FIG. 12, fastened via the fastening member 104*c* such as a bolt, a nut and the like. By means of this, for the exhaust gas pipe 100, the third exhaust part 103 is fixedly supported via the pipe bracket 104*a*, the tank bracket 104*b* and the like at the fuel tank 12.

The tractor 1 of the present embodiment comprises, as shown in FIG. 12, the elastic body 104*d* which lies between the pipe bracket 104*a* and the tank bracket 104*b*, in a state where the pipe bracket 104*a* and the tank bracket 104*b* are fastened by the fastening member 104*c*. By means of this, on the occasion when the exhaust gas pipe 100 and the fuel tank 12 are relatively displaced during working or the like, a shock which might occur between the pipe bracket 104*a* and the tank bracket 104*b* can be suppressed.

Moreover, the tractor 1 comprises, as shown in FIG. 12, the heat insulating material 104*e* which lies between the third exhaust part 103 of the exhaust gas pipe 100 and the tank bracket 104*b* that is disposed at the fuel tank 12. In the present embodiment, the heat insulating material 104*e* is disposed at the pipe bracket 104*a*. By means of this, since the heat insulating material 104*e* carries out heat insulation between the third exhaust part 103 of the exhaust gas pipe 100 and the tank bracket 104*b*, it can be suppressed that exhaust heat of the exhaust gas pipe 100 is transmitted to the side of the fuel tank 12 and, for example, heat deformation of the above-mentioned elastic body 104*d* is suppressed, so that degradation of the exhaust gas pipe 100 can be suppressed.

In a state where the first exhaust part 101 is supported at the side of the DOC/muffler 46, and the third exhaust part 103 is supported at the fuel tank (in what follows, said to be a "setup state" in some cases), as exemplified in FIG. 11, the second exhaust part 102 is parallely disposed so as to be along the end part line 6*a* of the bonnet 6 at the rear side in the front-and-rear direction. Moreover, in a setup state, as exemplified in FIG. 13, the exhaust port 103*a* of the tip end of the third exhaust part 103 is positioned at the upper side of the oil-pressure valve 14 for loaders in the vertical direction.

Here, the oil-pressure valve 14 for loaders is disposed at the lower side of the floor 13 of the operator seat 8 (refer to FIG. 1) with respect to the vertical direction, and, at the front side of the fuel tank 12 with respect to the front-and-rear direction. The oil-pressure valve 14 for loaders is, as shown in FIGS. 14-16, a valve to which the oil-pressure lines are joined that supplies, to the loader 15, operating oil for allowing the loader 15 to operate which is disposed so as to be attachable to and detachable from the vehicle-body front part 1F. The loader 15 operates with oil-pressure in accordance with manipulation of the loader control lever 16 which is disposed, as shown in FIG. 17 and the like, in the neighborhood of the operator seat 8 (in the present embodiment, at the right side of and frontward of the operator seat 8). For example, the whole of the loader 15 goes up if the loader control lever 16 is pulled to the rear side, and the whole of the loader 15 goes down if the loader control lever 16 is pushed to the front side. And, for example, only the bucket of the tip end part of the loader 15 goes down if the loader control lever 16 is inclined to the right side, and only the bucket of the tip end part of the loader 15 goes up if the loader control lever 16 is inclined to the left side.

And, in more detail, as shown in FIG. 13, in a setup state, the exhaust port 103*a* of the tip end of the third exhaust part 103 is positioned at the lower side of the floor 13 with respect to the vertical direction, and, at the upper side of the oil-pressure valve 14 for loaders. Moreover, the exhaust port 103*a* of the tip end of the third exhaust part 103 is positioned outside compared to the oil-pressure valve 14 for loaders with respect to the vehicle-width direction, and, inside compared to the vehicle-width of the whole of the tractor 1. By means of this, the oil-pressure valve 14 for loaders is not subjected to exhaust gas which is discharged from the exhaust port 103*a* of the exhaust gas pipe 100, and influence of exhaust heat can be suppressed. Moreover, in the tractor 1 which comprises the safety frame 9 of a folding type, the maximum height of the first exhaust part 101 in the vertical direction is equal to or less than the maximum height of the safety frame 9 in a state of being folded (refer to FIG. 5) in the vertical direction.

Moreover, the tractor 1 of the present embodiment comprises, as shown in FIGS. 8-11 and 18, the protection cover 105 for protecting the exhaust gas pipe 100. The protection cover 105 of the present embodiment is configured to include the first cover 105*a*, the second cover 105*b*, the third cover 105*c* and the like.

The first cover 105*a* is a cover, which covers and protects the portion of the first exhaust part 101 that is exposed from the bonnet 6, the bending part between the first exhaust part 101 and the second exhaust part 102, and the second exhaust part 102. The second cover 105*b* is a cover, which covers and protects the bending part between the second exhaust part 102 and the third exhaust part 103. The third cover 105*c* is a cover, which covers and protects the third exhaust part 103.

In more detail, the first cover 105*a* is configured with the upper face 105*d*, the front face 105*e*, the rear face 105*f* and the right side face 105*g*, being integral, and is formed as a cover in a box-like shape, such that the lower face and the left side face are opened. The upper face 105*d* covers the portion of the first exhaust part 101 which is exposed from the bonnet 6, and the upper side of the bending part between the first exhaust part 101 and the second exhaust part 102 in the vertical direction. The front face 105e covers the portion of the first exhaust part 101 which is exposed from the bonnet 6, the bending part between the first exhaust part 101 and the second exhaust part 102, and the front side of the second exhaust part 102 in the front-and-rear direction. The rear face 105f covers the portion of the first exhaust part 101 which is exposed from the bonnet 6, the bending part between the first exhaust part 101 and the second exhaust part 102, and the rear side of the second exhaust part 102 in the front-and-rear direction. The right side face 105g covers the bending part between the first exhaust part 101 and the second exhaust part 102, and the right side of the second exhaust part 102 in the vehicle-width direction. The upper face 105d is fixed to the upper part of the first exhaust part 101, the front face 105e is fixed to the front part of the second exhaust part 102, and the rear face 105f is fixed to the rear part of the second exhaust part 102, and thereby the first cover 105a is mounted on the exhaust gas pipe 100, so that position-determination and fixation are carried out. Moreover, for the first cover 105a, in the front face 105e and the right side face 105g the slits 105h which are for ventilation are plurally formed. On the other hand, in the upper face 105d and the rear face 105f no slits are formed, and the whole faces are obstructed.

The second cover 105b is formed as a cover in a plate-like shape so as to cover the right upper face of the bending part between the second exhaust part 102 and the third exhaust part 103. The second cover 105b is formed integrally with the upper face 105i of the third cover 105c. The third cover 105c is configured with the upper face 105i, the front face 105j and the rear face 105k, being integral, and is formed as a cover in a box-like shape (or in a drainpipe-like shape), such that the lower face, the left side face and the right side face are opened. The upper face 105i covers the upper side of the third exhaust part 103 in the vertical direction, and is formed integrally with the second cover 105b. The front face 105j covers the front side of the third exhaust part 103 in the front-and-rear direction. The rear face 105k covers the rear side of the third exhaust part 103 in the front-and-rear direction. The exhaust port 103a of the exhaust gas pipe 100 is exposed from the right side face of this third cover 105c. The upper face 105i is fixed to the upper part of the third exhaust part 103, and thereby the second cover 105b and the third cover 105c are mounted on the exhaust gas pipe 100, so that position-determination and fixation are carried out.

Since the protection cover 105 which is configured as mentioned above can protect by the first cover 105a, the second cover 105b and the third cover 105c, each part of the exhaust gas pipe 100, damage of the exhaust gas pipe 100 can be suppressed, and safetiness with respect to exhaust heat can be ensured. In addition, in a state of being protected by the protection cover 105, since the lower face of the portion of the first exhaust part 101 which is exposed from the bonnet 6, the left side face of the bending part between the first exhaust part 101 and the second exhaust part 102, the left side face of the first exhaust part 101, the front face, rear face and left side face of the bending part between the second exhaust part 102 and the third exhaust part 103, the lower face of the third exhaust part 103 and the like are exposed, the exhaust gas pipe 100 is favorably cooled by a traveling wind, a wind sent from the fan which cools the engine 4 inside the bonnet 6 and the like. By means of this, since exhaust temperature in the exhaust gas pipe 100 can be suppressed, safetiness can be improved, and influence on crops and the like can be decreased. Additionally, the above-mentioned exposure loci of the exhaust gas pipe 100 are, since being protected by the bonnet 6, other components and the like, and being positioned in the neighborhood of the steering-and-rotation range of the front wheel 2 at the right side, basically, arranged at safe positions which are not touched by a worker and the like. Moreover, the above-mentioned pipe bracket 104a is fixed to the portion of the lower part of the third exhaust part 103, which is exposed from the protection cover 105.

Further, the protection cover 105 which is configured as mentioned above is, since in the front face 105e of the first cover 105a the plural slits 105h are disposed, the exhaust gas pipe 100 is further favorably cooled by a traveling wind, a wind sent from the fan inside the bonnet 6 and the like. Moreover, the protection cover 105 can, since in the right side face 105g of the first cover 105a the plural slits 105h are disposed, promote heat radiation of the exhaust gas pipe 100, and the exhaust gas pipe 100 is further favorably cooled. On the other hand, the protection cover 105 can, since in the rear face 105f of the first cover 105a at the side of the operator seat 8 no slits are disposed and the whole face is obstructed, suppress hot wind due to exhaust heat blowing against a driver and the like.

The tractor 1 which is configured as mentioned above is a tractor having the safety frame 9, which is a structure-body that ensures safety at the time of overturning, and comprises: the engine 4 which is housed inside the bonnet 6 of the vehicle-body front part 1F; and the exhaust gas pipe 100 having: the first exhaust part 101 which is an exhaust part where exhaust gas that is discharged from the engine 4 flows, and protrudes from the bonnet 6 to the right side in the vehicle-width direction; the second exhaust part 102 which communicates with the end part of the first exhaust part 101 at the right side in the vehicle-width direction and is disposed towards the lower side in the vertical direction; and the third exhaust part 103 which communicates with the end part of the second exhaust part 102 at the lower side in the vertical direction and protrudes to the right side in the vehicle-width direction.

Hence, exhaust gas from the engine 4 can be, by the exhaust gas pipe 100, led from the bonnet 6 to the right side in the vehicle-width direction, guided to the lower side in the vertical direction, and discharged towards the right side in the vehicle-width direction. In addition, for example, in a case where at places where the ceiling height is low, such as a plastic house inside, its exit-and-entrance and the like, the safety frame 9 is folded with the folding-and-compactifying position and working is carried out, it can be suppressed that the exhaust gas pipe 100 gets stuck to the ceiling and the like. As a result of this, exhaust gas from the engine 4 is properly discharged and, since working at places where the ceiling height is low can be enabled to be carried out, versatility can be improved.

In more detail, since the maximum height of the first exhaust part 101 of the exhaust gas pipe 100 in the vertical direction is equal to or less than the maximum height of the safety frame 9 in a state of being folded in the vertical direction, it can be certainly suppressed that the exhaust gas pipe 100 which is weaker in strength than the safety frame 9 is caught at the ceiling and the like, and it can be suppressed that the exhaust gas pipe 100 collapses.

Moreover, the third exhaust part 103 of the exhaust gas pipe 100 is supported via the bracket 104 (the pipe bracket 104a and the tank bracket 104b) at the fuel tank 12. Hence, the exhaust gas pipe 100 can be stably supported.

Further, the second exhaust part 102 of the exhaust gas pipe 100 is parallely disposed so as to be along the end part line 6a of the bonnet 6 at the rear side in the front-and-rear direction.

By means of this, since the line of the second exhaust part 102 of the exhaust gas pipe 100 at the rear side in the front-and-rear direction becomes roughly the same with the end part line 6a of the bonnet 6, frontward visibility can be ensured and, for example, the loader 15 can be installed at the same time.

Additionally, on the exhaust gas pipe 100 described in the foregoing, as exemplified in FIGS. 19 and 20, the extending pipe 106 which changes the exhaust direction is also able to be installed. The extending pipe 106 exemplified in FIGS. 19 and 20 is configured with a pipe which is bent at an appropriate angle. In the present embodiment, the extending pipe 106 is configured with a pipe which is bent roughly in an L-shape. The extending pipe 106 is, with one end part being joined via the clamp 107 or the like to the exhaust port 103a of the third exhaust part 103, communicates with the third exhaust part 103. And, the extending pipe 106 is assembled to the third exhaust part 103, so that the opening of the other end part is, for example, towards the rear side in the front-and-rear direction. In this case, for the extending pipe 106, the opening of the other end part functions as the exhaust port 106a. By means of this, by the extending pipe 106, the exhaust direction of exhaust gas can be changed to an arbitrary direction in accordance with the kinds and places of working or the like. In the present embodiment, the extending pipe 106 can discharge exhaust gas from the engine 4, towards the rear side in the front-and-rear direction. Additionally, for the extending pipe 106 exemplified in FIGS. 19 and 20, the tip end is cut, and the exhaust port 106a is formed to slant as a taper face but, for example, as exemplified in FIG. 21, the tip end may be straightly formed, so that the exhaust port 106a is formed in a shape which has no slants. Moreover, the shape of the extending pipe 106 is not restricted to a shape with bending roughly in an L-shape, and a shape with bending at a predetermined angle can be arbitrarily selected and used. As a result of this, for example, on the occasion when the tractor 1 is used at places, where feathers are whirled up if exhaust gas is discharged downward, such as a chicken house and the like, discharging is carried out obliquely rearward by the extending pipe 106, and thereby whirling-up of feathers can be suppressed. On the other hand, for example, in a fruit farm and the like discharging is carried out downward by another extending pipe, and thereby damaging of trees can be suppressed.

Additionally, a working vehicle related to an embodiment of the above-mentioned present invention is not limited with the above-mentioned embodiments, and all sorts of changes are able to be carried out.

In the foregoing description, the first exhaust part 101 and the third exhaust part 103, which protrude to the right side in the vehicle-width direction as one side in the vehicle-width direction, may be exhaust parts which protrude to the left side in the vehicle-width direction as one side in the vehicle-width direction. Namely, the exhaust gas pipe 100 may be disposed at the left side of the bonnet 6 in the vehicle-width direction.

What is claimed is:

1. A working vehicle, comprising:
an engine which is housed inside a bonnet of a front part of a vehicle-body;
a purification processing device which performs purification processing of exhaust gas that is discharged from the engine; and
an exhaust member which discharges the exhaust gas that is discharged from the purification processing device, to an atmosphere, wherein
the exhaust member has: a first exhaust part which protrudes from the bonnet to one side in a vehicle-width direction; a second exhaust part which communicates with an end part of the first exhaust part, and is disposed in an up-and-down direction of the vehicle-body; and a third exhaust part which communicates with an end part of the second exhaust part, and protrudes to the one side in the vehicle-width direction,
a height of an exhaust port of the third exhaust part is lower than a height of a floor of an operator seat,
a protection cover which covers the first exhaust part, the second exhaust part and the third exhaust part; and a bracket which connects the third exhaust part to a side of the vehicle-body,
the second exhaust part is arranged so as to be along an end part line of the bonnet at a rear side,
an oil-pressure valve for operating a loader to be attached to the front part of the vehicle-body is disposed at a lower side of the floor of the operator seat, and at a front side of a fuel tank, and
the exhaust port of the third exhaust part is arranged at an upper side of the oil-pressure valve, outside compared to the oil-pressure valve, and inside compared to a vehicle-width.

2. The working vehicle according to claim 1, wherein for the exhaust member, the third exhaust part is supported via the bracket at the fuel tank.

3. A working vehicle, comprising:
an engine which is housed inside a bonnet of a front part of a vehicle-body;
a purification processing device which performs purification processing of exhaust gas that is discharged from the engine; and
an exhaust member which discharges the exhaust gas that is discharged from the purification processing device, to an atmosphere, wherein
the exhaust member has: a first exhaust part which protrudes from the bonnet to one side in a vehicle-width direction; a second exhaust part which communicates with an end part of the first exhaust part, and is disposed in an up-and-down direction of the vehicle-body; and a third exhaust part which communicates with an end part of the second exhaust part, and protrudes to the one side in the vehicle-width direction,
a height of an exhaust port of the third exhaust part is lower than a height of a floor of an operator seat,
a protection cover which covers the first exhaust part, the second exhaust part and the third exhaust part; and a bracket which connects the third exhaust part to a side of the vehicle-body,
the second exhaust part is arranged so as to be along an end part line of the bonnet at a rear side,
an oil-pressure valve for operating a loader to be attached to the front part of the vehicle-body is disposed at a lower side of the floor of the operator seat, and
the exhaust port of the third exhaust part is arranged at an upper side of the oil-pressure valve, outside compared to the oil-pressure valve, and inside compared to a vehicle-width.

* * * * *